United States Patent [19]

Blahak et al.

[11] 4,016,143
[45] Apr. 5, 1977

[54] POLYURETHANES BASED ON AROMATIC POLYAMINES

[75] Inventors: Johannes Blahak, Cologne; Erwin Müller; Karl Hartwig Richert, both of Leverkusen, all of Germany

[73] Assignee: Bayer Aktiengesellschaft, Leverkusen, Germany

[22] Filed: May 18, 1976

[21] Appl. No.: 687,570

Related U.S. Application Data

[60] Division of Ser. No. 440,210, Feb. 6, 1974, Pat. No. 3,975,428, which is a continuation of Ser. No. 306,783, Nov. 15, 1972, abandoned.

[30] Foreign Application Priority Data

May 28, 1975 Japan .............................. 50-62869

[52] U.S. Cl. ................ 260/77.5 AM; 260/2.5 AM; 260/75 NH; 260/77.5 CH
[51] Int. Cl.² ................ C08G 18/32; C08G 18/14
[58] Field of Search ........... 260/77.5 AM, 77.5 CH, 260/75 NH, 2.5 AM

[56] References Cited

UNITED STATES PATENTS

| 3,736,350 | 5/1973 | Meckel et al. | 260/472 |
| 3,817,940 | 6/1974 | Blahak et al. | 260/77.5 |
| 3,884,959 | 5/1975 | Adams | 260/471 |

*Primary Examiner*—H.S. Cockeram
*Attorney, Agent, or Firm*—Gene Harsh; Joseph C. Gil; William E. Parry

[57] ABSTRACT

Aromatic di- and triamines are disclosed which amines are prepared by reacting isatoic acid anhydride with a compound containing at least two hydroxyl groups and at least one tertiary nitrogen group and having a molecular weight of from about 119 to about 1000. These amines are especially suited for preparing polyurethane resins by reaction with polyisocyanates.

6 Claims, No Drawings

POLYURETHANES BASED ON AROMATIC POLYAMINES

This is a divisional of application Ser. No. 440,210, filed Feb. 6, 1974, and now U.S. Pat. No. 3,975,428, which itself is a continuation of application Ser. No. 306,783, filed Nov. 15, 1972, and now abandoned.

This invention relates to aromatic polyamines, a process for their production, and to polyurethane resins prepared therefrom.

Published Dutch Patent Application No. 7,111,328 describes a process for the preparation of anthranilic acid esters from polyols and isatoic acid anhydride, wherein isatoic acid anhyride is reacted with polyols in the presence of catalyst, such as, for example, sodium hydroxide. The amines obtained, or hydroxylamines when the isatoic acid is used in less than equivalent quantities, are used, for example, as chainlengthening agents for the production of polyurethane resins.

The process of said Dutch Application requires that a catalyst be used which necessitates removing the same from the reaction mixture and the tensile strengths of the polyurethanes prepared using the amines of the Dutch Application are not entirely satisfactory.

It is therefore an object of this invention to provide aromatic polyamines by a process devoid of the disadvantages of the prior art. It is a further object of this invention to provide aromatic diamines and tetraamines containing at least one tertiary nitrogen group. Another object of this invention is to provide polyurethane resins based on the novel polyamines of the invention. An additional object of this invention is to provide elastic and semi-elastic polyurethane foams having improved physical properties.

The foregoing objects and others which will become apparent from the following description are accomplished in accordance with the invention, generally speaking, by providing polyamines prepared by a process comprising reacting compounds which contain at least one tertiary nitrogen atom and at least two hydroxyl groups and which have a molecular weight of from about 119 to about 1000 with isatoic acid anhydride. It has surprisingly been found that catalysts are not required and can be dispensed with when polyamines are prepared by reacting tertiary nitrogen containing polyols with isatoic acid anhydride according to the process of the invention.

The starting materials used in the process according to the invention are known compounds having a molecular weight of from about 119 to about 1000 which contain at least one tertiary nitrogen atom and at the same time at least two hydroxyl groups. Some suitable compounds of this type are, for example, N-methyl-diethanolamine, N-ethyl-diethanolamine, N-hexyl-diethanolamine, N-phenyl-diethanolamine, N-butyldiethanolamine, bis-(2-hydroxyethyl) oleylamine, triethanolamine and reaction products of these compounds with propylene oxide and/or ethylene oxide. Reaction products of polyamines such as ethylene diamine and hexylene diamine with ethylene oxide and/or propylene oxide may also be used. The preferred starting materials are polyols with a molecular weight of from about 119 to about 600 which contain at least one tertiary nitrogen atom and at least two hydroxyl groups, especially N-methyldiethanolamine and N-methyl triethanolamine as well as reaction products of ethylene oxide or propylene oxide with N-methyl-diethanolamine or -triethanolamine. The process according to the invention is carried out in an analogous manner to the process described in Dutch Patent Application No. 7,111,328 but preferably without the catalysts mentioned there although the said catalysts may be included if desired, such as, for example, sodium hydroxide, potassium hydroxide, potassium carbonate or potassium acetate.

The process according to the invention may be carried out, for example, as follows:

Compounds having a molecular weight of from about 119 to about 1000 which contain at least one tertiary nitrogen atom and at least two hydroxyl groups are reacted with isatoic acid anhydride in solvents which do not react with isatoic acid anhydride, preferably in tetrahydrofuran or dioxane, at temperatures of from about 0° to about 120° C., preferably from about 20° to about 100° C. After removal of the solvent, the product of the process may be purified, for example, by recrystallization from aqueous dioxane or ethanol. It is preferred, however, to carry out the reaction without the use of solvents by adding the isatoic acid anhydride to the polyols which contain tertiary nitrogen.

The compounds which contain at least one tertiary nitrogen atom and n (n is at least two) hydroxyl groups are generally reacted with isatoic acid anhydride in such proportions that at least n equivalents of isatoic acid anhydride are used. If, however, it is desired that not all the OH-groups react with isatoic acid anhydride, then less than n equivalents of isatoic acid anhydride are used such as, for example, from about 0.5 to about 0.9 equivalents, so as to obtain hydroxylamines.

This invention contemplates diamines of the formula:

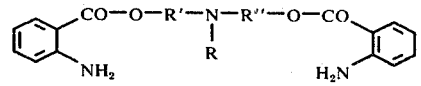

wherein

R is a saturated or unsaturated $C_1$ to $C_{18}$ alkyl radical, a $C_3$ to $C_{10}$ cycloalkyl radical, a $C_7$ to $C_{11}$ aralkyl radical or a $C_6$ to $C_{10}$ aryl radical; and R' and R'', which may be the same or different, represent a $C_2$ to $C_{30}$ alkylene radical, if desired, interrupted by oxygen atoms; and to triamines of the formula:

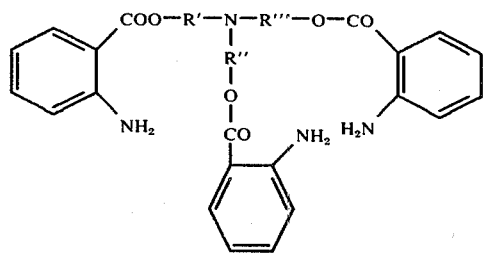

wherein

R', R'' and R''' are the same or different and represent a $C_2$ to $C_{30}$ alkylene radical, if desired, interrupted by oxygen atoms.

The following are examples of compounds prepared according to the invention:

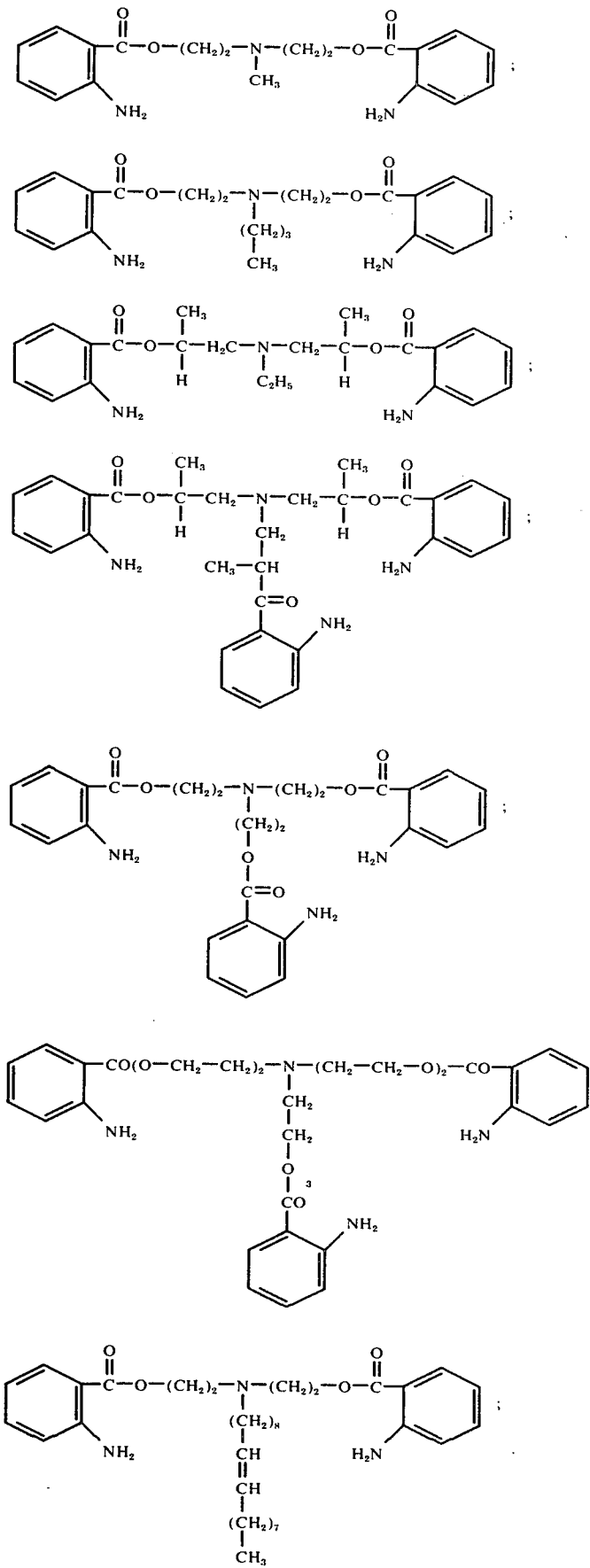

-continued

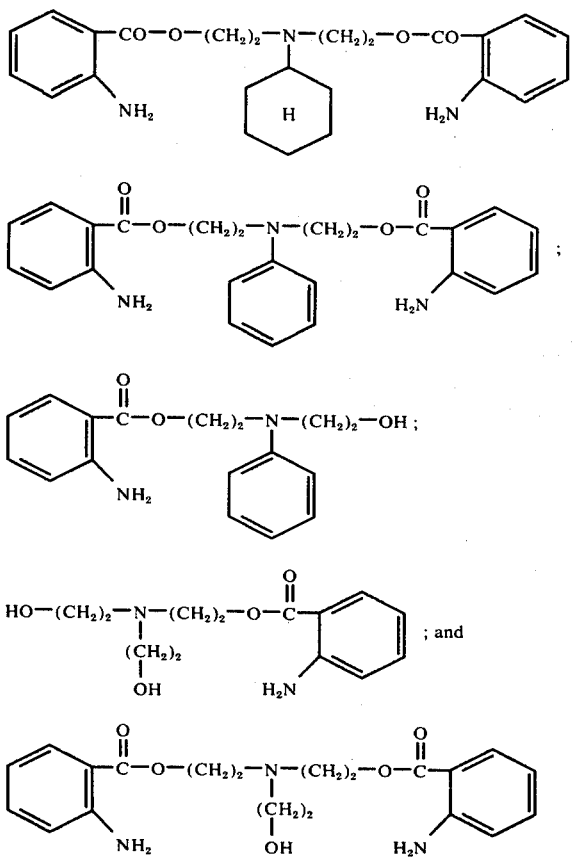

The ester group present in the ortho-position to the amino group in the polyamines prepared according to the invention reduces the reactivity of the amino group towards isocyanates to such an extent that this new class of compounds is comparable in its reactivity to the conventional hydroxyl-containing chain-lengthening agents used in polyurethane chemistry.

Thus, the invention also relates to the use of reaction products of isatoic acid anhydride and compounds with a molecular weight of from about 119 to about 1000 which contain at least one tertiary nitrogen atom and at least two hydroxyl groups as reactants in the production of synthetic resins by the isocyanate polyaddition process.

The production of synthetic resins from the compounds according to the invention may be carried out by known processes, for example, a higher molecular weight compound containing active hydrogen atoms may first be reacted with polyisocyanates, the compounds according to the invention being then added and the mixture reacted with or without the presence of a substance which liberates a gas.

Alternatively, the compounds according to the invention may be mixed with higher molecular weight compounds which contain active hydrogen atoms, the mixture being then reacted with isocyanates. The reaction may be carried out in the presence of any of the known additives used in polyisocyanate chemistry, for example, catalysts, blowing agents, flame-retarding substance and the like.

The higher molecular weight compounds which may be used in the present process are mainly higher molecular weight hydroxyl compounds, i.e., conventional polyhydroxyl compounds with a molecular-weight of from about 750 to about 10,000, for example, linear or slightly branched polyesters containing terminal hydroxyl groups which may be prepared by known methods, from monofunctional or polyfunctional alcohols and carboxylic acids or hydroxycarboxylic acid, if desired with the addition of amino alcohols, diamines, hydroxylamines or diamino alcohols. Polyesters which are particularly preferred are aliphatic polycarbonates such as hexanediol polycarbonate and caprolactone polyesters which may be obtained by the polymerization of caprolactone in the presence of initiator molecules such as glycols. Linear or branched polyethers which may be obtained by the polymerization of alkylene oxides such as ethylene oxide, propylene oxide, epichlorohydrin or tetrahydrofuran are also suitable. Copolymers of this type may also be included. Other suitable compounds include linear or branched addition products which may be prepared by addition of the above mentioned alkylene oxides to polyfunctional alcohols, amino alcohols or amines.

Preferred starting materials for the process according to the invention are polyethers which contain at least two active hydrogen atoms, preferably with a molecular weight of from about 750 to about 10,000, in which at least about 10% of the hydroxyl groups present are primary OH-groups. Polyethers of this type are prepared by reacting compounds which contain reactive hydrogen atoms, i.e., polyalcohols and polyphenols, with alkylene oxides such as ethylene oxide, propylene oxide, butylene oxide, styrene oxide or epichlorohydrin or with mixtures of these alkylene oxides and if desired subsequently modifying the resulting polyethers with ethylene oxide.

Some examples of suitable polyalcohols and polyphenols are ethylene glycol, diethylene glycol, polyethylene glycol, propane-1,2-diol, propane-1,3-diol, butane-1,4-diol, hexane-1,6-diol, decane-1,10-diol, butyne-2-diol-(1,4), glycerol, butane-2,4-diol, hexane-1,3,6-triol, trimethylolpropane, resorcinol, di-tert.-butyl pyrocatechol, 3-hydroxy-2-naphthol, 6,7-dihydroxyl-1-naphthol, 2,5-dihydroxy-1-naphthol, 2,2-(p-hydroxyphenyl) propane, bis-(p-hydroxyphenyl) methane and tris-(hydroxyphenyl) alkanes such as 1,1,2-tris-hydroxyphenyl) methane and 1,1,3-tris-(hydroxyphenyl) propane.

Other suitable polyethers are 1,2-alkylene oxide derivatives of aliphatic or aromatic monoamines or polyamines such as ammonia, methylamine, ethylene diamine, N,N'-dimethyl-ethylene diamine, tetraor hexamethylene diamine, diethylene triamine, ethanolamine, diethanolamine, methyl diethanolamine, triethanolamine, aminoethyl piperazine, toluidine, o-, m- and p-phenylene diamine, 2,4- and 2,6-diaminotoluene, 2,6-diamino-p-xylene, multi-nuclear and condensed aromatic polyamines such as naphthylene-1,4-diamine, benzidine, 2,2'-dichloro-4,4'-diphenyl diamine and 4,4'-diaminoazobenzene. Resinous materials of the phenol or resol type may also be used as starting materials.

All of these polyethers are preferably synthesized using ethylene oxide and preferably contain at least about 10% of primary OH-groups. The said polyethers may also be modified by reacting them with less than equivalent quantities of polyisocyanate.

Other higher molecular weight compounds containing active hydrogen atoms include the known polyacetals, polyester amides, polycarbonates and polyols which contain urethane groups. The higher molecular weight compounds containing reactive hydrogen atoms for use according to the invention may also be used in admixture with low molecular weight compounds containing active hydrogen atoms, with molecular weights of up to about 750. The low molecular weight compounds containing active hydrogen atoms which may be used are mainly compounds which contain hydroxyl groups such as, for example, ethylene glycol, 1,3-butylene glycol, 1,4-butylene glycol, glycerol, trimethylolpropane, castor oil or addition products, which generally have molecular weights of from about 200 to about 750, obtained by addition reactions of alkylene oxides such as ethylene oxide, propylene oxide or butylene oxide with low molecular weight compounds containing active hydrogen atoms of the type mentioned above or with water.

Higher molecular weight compounds which contain amino groups are also advantageously used such as, for example, those described in German Offenlegungsschrift No. 2,019,432. In that case, the synthetic resins obtained differ from the polyurethane resins previously described in that they do not contain urethane groups as chain-linking groups but urea groups in addition to ester and ether groups.

The isocyanates used are conventional polyisocyanates some of which are, for example, tetramethylene-1,4-diisocyanate, hexamethylene-1,6-diisocyanate, dodecane-1,12-diisocyanate, cyclohexane-1,3- and -1,4-diisocyanate and any mixtures of these isomers, 1-isocyanato-3,3,5-trimethyl-5-isocyanatomethylcyclohexane, phenylene-1,3- and -1,4-diisocyanate, tolylene-2,4- and -2,6-diisocyanate and any mixtures of these isomers, hexahydrotolylene-2,4- and -2,6-diisocyanate and any mixtures of these isomers, diphenylmethane-4,4'-diisocyanate, naphthylene-1,5-diisocyanate, triphenylmethane-4,4',4''-triisocyanate and polyphenyl-polymethylene-polyisocyanates which may be obtained by the condensation of aniline and formaldehyde followed by phosgenation. Polyisocyanates which contain carbodiimide-isocyanate adducts prepared according to German Patent Specification No. 1,092,007; the diisocyanates described in United States Patent Specification No. 3,492,330; polyisocyanates which contain allophanate groups as described in British Patent Specification No. 994,890, Belgian Patent Specification No. 761,626 and published Dutch Patent Application No. 7,102,524; isocyanurate polyisocyanates as described in Germen Patent Specification Nos. 1,022,789 and 1,027,394 and in German Offenlegungsschrift Nos. 1,929,034 and 2,004,048; polyisocyanates containing biuret groups as described in German Patent Specification No. 1,101,394, British patent specification No. 889,050 and French Patent Specification No. 7,017,514; polyisocyanates prepared by telomerization reactions as described in Belgian Patent Specification No. 723,640; polyisocyanates containing ester groups according to British patent specification Nos. 956,474 and 1,072,956; the aliphatic, cycloaliphatic, araliphatic and aromatic polyisocyanates described by W. Siefken in Justus Liebig's Annalen der Chemie, 562, pages 75 to 136; reaction products of the above mentioned isocyanates with acetals according to German Patent Specification No. 1,027,385; and the isocyanates mentioned in German Patent Specification Nos. 1,022,789 and 1,027,394 are also suitable.

Any mixtures of the above mentioned polyisocyanates may, of course, be used.

It is generally preferred to use the commercially available polyisocyanates such as tolylene-2,4-diisocyanate and tolylene-2,6-diisocyanate or any mixtures of these isomers or polyphenyl-polymethylene-polyisocyanates which may be obtained by the condensation of aniline with formaldehyde followed by phosgenation.

Polyisocyanates which are also preferred according to the invention are solutions of so-called modified polyisocyanates, i.e., solutions of polyisocyanates containing biuret groups in polyisocyanates which are free from biuret groups and/or solutions of polyisocyanantes which contain at least two NCO groups and at least one N,N'-disubstituted allophanic acid ester group in polyisocyanates which are free from allophanic acid ester groups and/or solutions of reaction products of polyisocyanates with compounds which contain two or more hydroxyl groups in polyisocyanates which are free from urethane groups and/or solutions of polyisocyanates which contain more than one NCO group and at least one isocyanuric acid ring in polyisocyanates which are free from isocyanurate groups.

The preferred solutions of modified polyisocyanates according to the invention generally contain from about 1 to about 85 percent by weight, preferably from about 10 to about 50 percent by weight of modified polyisocyanate.

Preparation of the allophanate polyisocyanates may be carried out, for example, according to British patent specification No. 994,890. Diisocyanates such as tolylene-2,4-diisocyanate or mixtures of this diisocyanate with tolylene-2,6-diisocyanate are preferably used for this purpose.

solutions of polyisocyanates containing biuret groups in polyisocyanates which are free from biuret groups are suitable modified polyisocyanates which may also be used for the invention. According to the invention, it is preferred to use from about 1 to about 85 percent by weight solutions of biuret polyisocyanates of the following general formula:

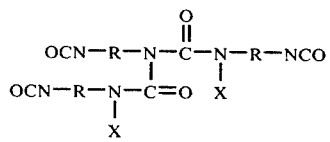

wherein

R is a $C_1$ to $C_{10}$ alkyl radical, $C_5$ to $C_{10}$ cycloalkyl radical, $C_7$ to $C_{12}$ aralkyl radical or $C_6$ to $C_{10}$ aryl radical and X is hydrogen or the group

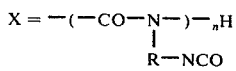

wherein

R has the meaning indicated above and $n$ is an integer of from 0 to 5, in polyisocyanates which are free from biuret groups, in which the proportion of biuret polyisocyanates which contain more than three isocyanate groups is at least about 20 percent by weight, based on the total quantity of biuret polyisocyanates. Polyisocyanates which contain biuret groups may be prepared, for example, according to the method described in British patent specification No. 889,050 or according to German Patent Specification No. 1,101,394. Preferred polyisocyanates for the invention are solutions in polyisocyanates which are free from biuret groups of biuret polyisocyanates which have been obtained by reacting tolylene-2,4-and/or -2,6-diisocyanate, diphenylmethane-4,4'-diisocyanate and/or isomers thereof or a polyisocyanate mixture obtained by phosgenation of aniline-formaldehyde condensates with water or formic acid. The polyisocyanates for use according to the invention preferably contain from about 0.03 to about 5 percent by weight and more particularly from about 0.1 to about 2 percent by weight of chemically bound emulsifiers. These emulsifiers should contain OH, amino, amido, HO—CO—, SH— or urethane groups and are therefore incorporated with the polyisocyanate by reaction with the isocyanate groups as described in German Offenlegungsschrift No. 1,963,189.

Often isocyanate components which may be used as starting materials according to the invention are those polyisocyanate mixtures which are characterized by containing polyisocyanates with urethane groups and which may have a higher degree of branching than purely difunctional isocyanates. These mixtures often contain from about 10% to about 70% and preferably from about 20% to about 50% of isocyanates containing urethane groups dissolved in polyisocyanates which are free from urethane groups.

The modified polyisocyanates used may also be solutions of polyisocyanates which contain at least one isocyanuric acid ring in liquid polyisocyanates which are free from isocyanurate groups. These polyisocyanates which contain isocyanurate groups and processes for their preparation are described, for example, in German Patent Specification Nos. 951,168 and 1,022,789, in British patent specification Nos. 821,158; 827,120; 856,372; 927,173; 920,080 and 952,931, in U.S. Pat. Nos. 3,154,522 and 2,801,244, in French Patent Specification No. 1,510,342 and in Belgian Patent Specification No. 718,994. The preferred polyisocyanates which contain at least one isocyanuric acid ring are polymeric tolylene-2,4- and/or -2,6-diisocyanates, if desired, mixed with 4,4'-diphenylmethane-diisocyanate or isomers thereof. These isocyanate mixtures used according to the invention are obtained by dissolving the polyisocyanate which contains isocyanurate groups in the liquid polyisocyanates which are free from isocyanurate groups, generally in concentrations of from about 1 to about 85 percent by weight, based on the weight of the resulting polyisocyanate solutions.

The polyisocyanates which are free from urethane groups, allophanate groups, isocyanurate groups or biuret groups may be aliphatic, cycloaliphatic, aromatic or araliphatic isocyanates, for example, those described in Liebig's Annalen der Chemie, Volume 562 (1949), page 755, et seq. It is preferred to use tolylene diisocyanate or mixtures of its isomers or undistilled isomeric mixtures of this diisocyanate, diphenylmethane-4,4'- or 2,4'-diisocyanate or the undistilled crude diisocyanate, naphthylene -1,5-diisocyanate, triphenylmethane 4,4',4"-triisocyanate, polyphenyl-polymethylene-polyisocyanates obtained by the condensation of aniline and/or alkyl-substituted anilines with formaldehyde followed by phosgenation, and isocyanates which contain carbodiimide-isocyanate adducts prepared, for example, according to German Patent Specification No. 1,092,007.

Preparation of self-extinguishing polyurethane foam resins is generally carried out by the known one-shot process, in which the foam is prepared by simply mixing the described polyisocyanates with higher molecular weight polyols at room temperature and/or elevated temperature in the presence of water and/or other blowing agents and, if desired, emulsifiers and other auxiliary agents as well as the auxiliary agents according to the invention. Mechanical devices and the processes described in German Patent Specification No. 881,881 are advantageously used for this purpose.

Suitable emulsifiers are, for example, addition products of ethylene oxide or of ethylene oxide and propylene oxide with hydrophobic substances which contain hydroxyalkylene, amino or amido groups. Tertiary amines and/or sila amines, N-substituted aziridines or hexahydrotriazines are used as catalysts for producing flame-retarding non-shrinking foam resins which contain urethane groups, if desired, in combination with organic metal compounds which accelerate to different extents the different partial reactions which take place in the course of formation of the foams. Whereas amines preferentially catalyze the expanding reaction, organic metal compounds preferentially act on the cross-linking reaction. The degree of catalytic acceleration of the expanding reaction, i.e., for example, the reaction between isocyanate groups and water with elimination of carbon dioxide, may vary depending on the constitution of the amines or sila amines used. In order to obtain the most convenient reaction times for the foaming process, the quantities to be used are determined empirically depending upon the constitution of the selected catalyst or catalyst mixture. The amines used may be the same as those commonly used for the preparation of polyurethane foams, for example, dimethyl benzylamine, N-methyl morpholine, triethylene diamine, dimethyl piperazine, 1,2-dimethyl imidazole, dimethyl ethanolamine, methyl diethanolamine, triethanolamine, diethylaminoethanol, N,N,N',N'-tetramethyl-1,3-butane diamine and N-methyl-N'-dimethylaminoethyl-piperazine.

The sila amines used are silicon compounds which contain carbon-silicon bonds as described, for example, in German Patent Specification No. 1,229,290. 2,2,4-trimethyl-2-silamorpholine and 1,3-diethylamino-methyl-tetramethyl-disiloxane are examples of these compounds. It should be noted, however, that bases which contain nitrogen, such as tetraalkyl ammonium hydroxides, and alkalis, alkali metal phenolates or alcoholates such as sodium methylate may also be used. The organic metal compounds which may be used in combination with amines, sila amines or hexahydrotriazines according to Belgian Patent Specification No. 730,356 are preferably organic tin compounds, for example, tin (II) octoate or dibutyl tin dilaurate.

Additives for regulating the cell structure as well as organic or inorganic fillers and dyes or plasticizers such as phthalic acid esters may be used.

Foams prepared according to the invention using flame-retarding additives of known type are flameproof and to be classified as self-extinguishing in accordance with the ASTM test D 1692 T. This most desirable property can be achieved by using known flame-retarding agents such as trichloro- or tribromo-alkyl phosphates but is partly lost under extreme conditions of storage such as high temperatures over prolonged periods. Permanent flame-resistance and therefore substantial improvement in the flame resistance which is in any case high can be achieved in the products of the process, for example, by modifying the modified polyisocyanate solutions with chlorine-containing and/or bromine-containing compounds which can be built into the product, i.e., which contain hydrogen atoms which are reactive with isocyanates. It is immaterial for the effect achieved at what point these flame-retarding additives are introduced, for example, whether they are built directly into the modified polyisocyanate or added subsequentially to the polyisocyanate solution or reaction mixtures.

Examples of suitable flame-retarding agents which may be used are 2-chloroethanol, 2-bromoethanol, trichloroethanol, 1,3- and 1,2-dichloropropanol, 2-bromopropanediol, 1,1-styrene chlorohydrin and -styrene bromohydrin and bromo acetic acid.

Elastic and semi-elastic foam resins obtained according to the invention are distinguished particularly by their exceptionally high tensile strength. They may be used, for example, as padding materials, mattresses, packaging materials, foils for laminates, insulating materials and, owing to their flame-resistance, they may be used wherever this property is particularly valuable, for example, in motor cars, aircraft and transport in general. The foam resins may be produced by the method of foaming in the mold or they may be manufactured from block-foamed material.

The invention is further illustrated in the following Examples wherein all parts and percentages are by weight unless otherwise indicated.

EXAMPLES

Example 1

4890 parts of isatoic acid anhydride (30 mol) are introduced into 1785 parts (15 mol) of N-methyl-diethanolamine at 50° C. When the initial exothermic reaction has died down, the reaction is completed by stepwise increase of temperature to about 80° C. The end point of the reaction is most easily recognized by a gas meter coming to a standstill. This gas meter is also advantageously used for controlling the reaction. The resulting reaction product is recrystallized from ethanol (1 part from 0.75 parts by volume of ethanol). The filtrate is vigorously cooled with ice, and about 4120 parts of product having a melting point of 71° to 72° C. (77% of theoretical) is precipitated.

The same reaction mixture prepared in 9000 parts by volume of dioxane yields about 5300 parts (99% of theoretical) of N-methyl-diethanolamine-dianthranilate of melting point 68° to 69° C. after removal of the dioxane.

Calculated: C 63.8 H 6.44 N 11.75. Found: C 64.0 H 6.5 N 11.8.

The following are examples of compounds which are obtained in analogous manner:

Example 2

Triethanolamine trianthranilate, melting point 101° to 102° C.

Calculated: C 64.0 H 5.92 N 11.05. Found: C 64.0 H 6.1 N 11.0

Example 3

Triethanolamine dianthranilate partly reacted (on 2 of the 3 OH-groups) esterified compound; viscous oil.

392.4 mg = 30.4 ml of N/10 $HClO_4$ in glacial acetic acid; indicator 0.1% solution of crystal violet in glacial acetic acid (theoretical). Found 30.1 ml of N/10 $HClO_4$.

Example 4

Reaction product of triethanolamine and ethylene oxide (molecular weight = 392) with isatoic acid anhydride 300 mg = 17.5 ml N/10 $HClO_4$ in glacial acetic acid (theoretical) Found: 17.1 ml N/10 $HClO_4$.

Example 5

100.0 parts of a propylene glycol which is initated on trimethylolpropane and modified with ethylene oxide to contain approximately 60% of primary hydroxyl end groups with OH number 36.0; 2.5 parts of water; 0.3 parts of endoethylene piperazine; 0.5 parts of tetramethyl ethylene diamine; 10.0 parts of N-methyl-diethanolamine dianthranilate; and 10.0 parts of monofluorotrichloromethane are mixed together and reacted with 43.0 parts of an allophanate polyisocyanate (NCO-content 35.1%), prepared as follows: 134 parts of trimethylolpropane are added in the course of about 1 hour to tolylene-2,4- and -2,6-diisocyanate (ratio of isomers 80:20) which is heated to 80° C., the temperature of the reaction mixture rising to 114° C. on addition of the trimethylolpropane. When the NCO-content reaches 41.3%, immediately after the addition of trimethylolpropane is completed, the reaction mixture is heated to 150° C. and maintained at this temperature for 20 hours. A solution of an allophanate polyisocyanate in a mixture of tolylene diisocyanate isomers is obtained which contains 38.1% of product and has a viscosity of 77 cP$^{25}$.

100 parts of 2,3-dibromopropanol-1 are added to 1900 parts of this solution at 80° C. and reacted for 2 ½ hours at 90° C. The modified allophanate polyisocyanate in isomeric tolylene diisocyanate mixture is characterized by: NCO-content 35.1%; viscosity 118 cP$^{25}$ and solids content 41%.

A foam resin having the following mechanical properties is obtained:

Density according to DIN 53 420 (kg/m$^3$) 42

Tensile strength according to DIN 53 571 (kg/cm$^2$) 1.2

Elongation at break according to DIN 53 571 (%) 130

Compression test at 40% compression according to DIN 53 577 (p/cm$^2$) 50

Example 6

100.0 parts by weight of a polypropylene glycol which is initiated on trimethylol propane and modified with ethylene oxide to contain approximately 60% of primary hydroxyl end groups with OH-number 35.0; 2.5 parts by weight of water; 0.2 parts by weight of endoethylene piperazine; 1.0 part by weight of triethylamine; 10.0 parts by weight of triethanolamine-trianthranilate; and 10.0 parts by weight of monofluorotrichloromethane are mixed together and reacted with 44.0 parts by weight of a mixture (NCO-content 39.5%) of 60.0 parts by weight of tolylene-2,4-diisocyanate, 10.0 parts by weight of tolylene-2,6-diisocyanate and 30.0 parts by weight of a polymeric tolylene-2,4-diisocyanate (NCO-content 20.8%).

A foam resin having the following mechanical properties is obtained:

Density according to DIN 53 420 (kg/m$^3$) 42

Tensile strength according to DIN 53 571 (kg/cm$^2$) 1.3

Elongation at break according to DIN 53 571 (%) 145

Compression test at 40% compression according to DIN 53 577 (p/cm$^2$) 45.

Example 7

100.0 parts by weight of a polypropylene glycol which is initiated on glycerol and modified with ethylene oxide to contain approximately 60% of primary hydroxyl end groups with OH-number 35.0; 2.5 parts by weight of water; 0.2 parts by weight of endoethylene piperazine; 0.5 parts by weight of tetramethyl ethylene diamine; 1.75 parts by weight of triethanolamine-trianthranilate; and 3.25 parts by weight of N-methyl-diethanolamine-dianthranilate are mixed together and reacted with 42.0 parts by weight of a mixture (NCO-content 38.5%) of 60 parts by weight of polyphenol-polymethylene-polyisocyanate which is prepared by aniline-formaldehyde condensation followed by phosgenation (NCO-content 31%) and 40 parts by weight of a mixture of tolylene-2,4- and -2,6-diisocyanate which contains 65% of tolylene-2,4-diisocyanate.

A foam resin having the following mechanical properties is obtained:

Density according to DIN 53420 (kg/m$^3$) 45

Tensile strength according to DIN 53 571 (kg/cm$^2$) 0.8

Elongation at break according to DIN 53 571 (%) 150

Compression test at 40% compression according to DIN 53 577 (p/cm$^2$) 30

Example 8

100.0 parts by weight of a polypropylene glycol which is initiated on trimethylolpropane-hexanetriol and modified with ethylene oxide to contain approximately 60% of primary hydroxyl end groups with OH-number 35.0; 2.5 parts by weight of water; 0.1 part by weight of endoethylene piperazine; 0.1 part by weight of tin (II) dioctoate; 0.5 parts by weight of N-methyl morpholine; and 2.0 parts by weight of triethanolamine-trianthranilate are mixed together and reacted in a closed mold with 40.2 parts by weight of a biuret polyisocyanate which is prepared by reacting a mixture of tolylene-2,4- and -2,6-diisocyanate (ratio of isomers 80:20% by weight) with water (NCO-content 38.5%).

A foam resin having the following mechanical properties is obtained:

Density according to DIN 53 420 (kg/m$^2$) 40

Tensile strength according to DIN 53 571 (kg/cm$^2$) 0.8

Elongation at break according to DIN 53 571 (%) 140

Compression test at 40% compression according to DIN 53 577 (p/cm$^2$) 35.

It is to be understood that any of the components and conditions mentioned as suitable herein can be substituted for its counterpart in the foregoing examples and that although the invention has been described in considerable detail in the fooregoing, such detail is solely for the purpose of illustration. Variations can be made in the invention by those skilled in the art without departing from the spirit and scope of the invention except as is set forth in the claims.

What is claimed is:

1. Polyurethanes prepared by a process which comprises a reacting
   a. polyisocyanates
   b. higher molecular weight compounds containing active hydrogen atoms with molecular weights of from about 750 to about 10,000
   c. polyamines of the formula

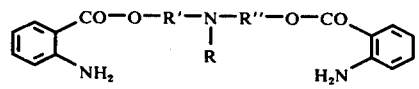

wherein R is a saturated or unsaturated C$_1$ to C$_{18}$ alkyl radical; C$_3$ to C$_{10}$ cycloalkyl radical; C$_7$ to C$_{11}$ aralkyl radical or C$_6$ to C$_{10}$ aryl radical; and R' and R'' are the same or different and represent C$_2$ to C$_{30}$ alkylene radicals which may be interrupted by oxygen atoms.

2. The polyuethanes of claim 1 wherein compounds (b) are polyhydroxyl compounds.

3. The polyurethanes of claim 2 wherein said compounds (b) have at least 10% primary hydroxyl groups.

4. Polyurethanes prepared by a process which comprises a reacting
   a. polyisocyanates
   b. higher molecular weight compounds containing active hydrogen atoms with molecular weights of from about 750 to about 10,000
   c. polyamines of the formula

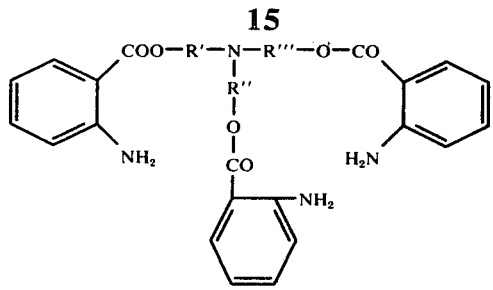
wherein
R', R" and R''' are the same or different and represent $C_2$ to $C_{30}$ alkylene radicals which may be interrupted by oxygen atoms.
5. The polyurethanes of claim 4 wherein compounds (b) are polyhydroxyl compounds.
6. The polyurethane of claim 5 wherein said compounds (b) have at least 10% primary hydroxyl groups.
* * * * *